United States Patent
Huang et al.

(10) Patent No.: US 8,839,377 B2
(45) Date of Patent: Sep. 16, 2014

(54) INFORMATION SHARING METHOD AND SYSTEM USING THE SAME

(71) Applicant: HTC Corporation, Taoyuan County (TW)

(72) Inventors: Hsiang-Tai Huang, Taoyuan County (TW); Chung-Huan Mei, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 13/674,109

(22) Filed: Nov. 12, 2012

(65) Prior Publication Data

US 2014/0137202 A1 May 15, 2014

(51) Int. Cl.
*H04L 29/00* (2006.01)

(52) U.S. Cl.
USPC ............................................................ 726/4

(58) Field of Classification Search
CPC .................................. H04L 9/32; H04L 63/08
USPC ........................ 726/4; 713/170; 380/247–250
See application file for complete search history.

(56) References Cited

U.S. PATENT DOCUMENTS

| | | | | |
|---|---|---|---|---|
| 4,641,937 A | * | 2/1987 | Suzuki | 396/264 |
| 5,666,426 A | * | 9/1997 | Helms | 381/57 |
| 8,128,497 B2 | * | 3/2012 | Miyamoto | 463/35 |
| 2006/0282649 A1 | * | 12/2006 | Malamud et al. | 712/26 |
| 2008/0292926 A1 | * | 11/2008 | Suzuki et al. | 429/22 |
| 2009/0034591 A1 | * | 2/2009 | Julian et al. | 375/220 |
| 2010/0082983 A1 | * | 4/2010 | Shah et al. | 713/169 |
| 2010/0281261 A1 | * | 11/2010 | Razzell | 713/171 |
| 2012/0045994 A1 | * | 2/2012 | Koh et al. | 455/41.3 |
| 2012/0271630 A1 | * | 10/2012 | Miki | 704/225 |
| 2013/0122810 A1 | * | 5/2013 | Kaufman | 455/41.2 |
| 2013/0237155 A1 | * | 9/2013 | Kim | 455/41.2 |

* cited by examiner

*Primary Examiner* — Hadi Armouche
*Assistant Examiner* — Shahriar Zarrineh
(74) *Attorney, Agent, or Firm* — Jianq Chyun IP Office (57) ABSTRACT

An information sharing method and a system using the same are provided. The information sharing method includes establishing a wireless connection between a first device and a second device. The method also includes determining whether a first surface of the first device is in proximity to a second surface of the second device according to an audio-based authorization mechanism, and the audio-based authorization mechanism is activated through an authorization audio message in which an identification message is embedded. If it is determined that the first surface is in proximity to the second surface, the method further includes sharing information by the first device with the second device through the wireless connection.

9 Claims, 5 Drawing Sheets

| Preamble | Target address | Source address | Length | Check code | Status request | Command |

FIG. 6

| Preamble | Target address | Source address | Length | Check code | Status replay |

FIG. 7

| Preamble | Source address | Length | Check code | Identification message |

FIG. 8

| Preamble | Source address | Target address | Length | Check code | Decoded message |

FIG. 9

INFORMATION SHARING METHOD AND SYSTEM USING THE SAME

BACKGROUND OF THE INVENTION

1. Field of the Invention

The invention relates to an information sharing method through wireless transmission. More particularly, the invention relates to an information sharing method which does not require manual settings of data-sharing targets and a system using the method.

2. Background of the Invention

Owing to the advancement in mobile communication, mobile communication devices (e.g., cell phones) have been growing in popularity. The cell phones tend to gradually replace the conventional home phone and have become the main media of communication in modern society. In terms of functions of the cell phones, the early cell phones may merely be applied for making phone calls, while the so-called feature phones capable of supporting certain application programs have been developed in recent years. Moreover, smart phones that have significant computational power and allow users to install software for expanding the functions on their own have also been presented to public.

When the users are about to share information through the mobile phones, the expanding functions of the existing mobile phones, however, result in an excessive number of sharing options and difficulty in deciding on one of the options. In particular, the existing mobile phones not only can support wireless transmission to share information with other devices but also may allow sharing of information on various social web-based platforms due to the rise and development of the social network. Hence, when a user intends to share a photo, the user must select the sharing option from the general menu to enter the sharing menu. The sharing menu lists all the available options to share a photo, e.g., through social network, wireless transmission, multimedia messages, or emails, and the user needs to spent some time on selecting one of the options. Given that the user plans to share photos through Bluetooth wireless transmission, the user is required to select the correct data-sharing target from all of the paired devices. Said operations are rather time-consuming and complicated, and it is rather difficult for the user to correctly and rapidly identify the target to share information from a large number of paired Bluetooth devices.

SUMMARY OF THE INVENTION

In view of the above, the invention is directed to an information sharing method and an information sharing system that allow a user to rapidly and intuitively share information between two devices.

In an embodiment of the invention, an information sharing method is provided, and the method includes establishing a wireless connection between a first device and a second device. The method also includes determining whether a first surface of the first device is in proximity to a second surface of the second device according to an audio-based authorization mechanism, and the audio-based authorization mechanism is activated through an authorization audio message in which an identification message is embedded. If it is determined that the first surface is in proximity to the second surface, the method further includes sharing information by the first device with the second device through the wireless connection.

According to an embodiment of the invention, the first device stores the authorization audio message. The step of determining whether the first surface of the first device is in proximity to the second surface of the second device according to the audio-based authorization mechanism includes instructing the second device through the wireless connection to determine whether an object approaches the second surface if the first device detects that an object approaches the first surface. If the second device detects that the object approaches the second surface, the second device prepares to receive the authorization audio message from the first device. After the second device completely receives the authorization audio message, the second device performs a parsing procedure to obtain a decoded message from the authorization audio message and transmits the decoded message to the first device. After the first device ascertains that the decoded message matches the identification message, the first device determines that the first surface is in proximity to the second surface.

According to an embodiment of the invention, the first device and the second device detect whether there is any nearby object through a proximity sensor, respectively.

According to an embodiment of the invention, the audio-based authorization mechanism includes an anti-noise process that is performed on the authorization audio message by the first device according to an environmental sound volume and/or an environmental sound frequency and a broadcast of the processed authorization audio message.

According to an embodiment of the invention, the anti-noise process includes adjusting a high-frequency sound volume and/or a low-frequency sound volume of the authorization audio message according to the environmental sound volume.

According to an embodiment of the invention, the anti-noise process includes adjusting an output frequency of the authorization audio message according to the environmental sound frequency.

According to an embodiment of the invention, the information shared by the first device is at least part of contents displayed on a screen of the first device.

According to an embodiment of the invention, at least one of the first surface and the second surface has a screen.

In another embodiment of the invention, an information sharing system that includes a first device and a second device is provided. The first device includes a first amplifier, a first wireless transmission module, a first sensor, and a first processor. The first processor is coupled to the first amplifier, the first wireless transmission module, and the first sensor. The second device includes a second microphone, a second wireless transmission module, a second sensor, and a second processor. The second processor is coupled to the second microphone, the second wireless transmission module, and the second sensor. A wireless connection between the first device and the second device is established by the first wireless transmission module and the second wireless transmission module according to a wireless transmission protocol. The first processor determines whether a first surface of the first device is in proximity to a second surface of the second device according to an audio-based authorization mechanism, and the audio-based authorization mechanism is activated through an authorization audio message in which an identification message is embedded. If it is determined the first surface is in proximity to the second surface, the first processor shares information with the second device through the wireless connection.

According to an embodiment of the invention, the first device further includes a storage unit that is coupled to the first processor and stores the authorization audio message. If the first device detects that an object approaches the first surface, the first processor instructs the second device through the wireless connection to determine whether an object approaches the second surface. If the second sensor detects that the object approaches the second surface, the second processor enables the second microphone to receive the authorization audio message from the first device. After the second processor completely receives the authorization audio message, the second processor performs a parsing procedure to obtain a decoded message from the authorization audio message and transmits the decoded message to the first device. After the first processor ascertains that the decoded message matches the identification message, the first processor determines that the first surface is in proximity to the second surface.

According to an embodiment of the invention, the second processor transmits the decoded message to the first device through the wireless connection.

According to an embodiment of the invention, the first device further includes a first microphone that is coupled to the first processor, and the second device further includes a second amplifier that is coupled to the second processor. The second processor transmits the decoded message through the second amplifier, and the first device receives the decoded message through the first microphone.

According to an embodiment of the invention, the first processor performs an anti-noise process on the authorization audio message according to an environmental sound volume and/or an environmental sound frequency and broadcasts the processed authorization audio message.

According to an embodiment of the invention, wherein the anti-noise process includes adjusting a high-frequency volume and/or a low-frequency volume of the authorization audio message according to the environmental sound volume.

According to an embodiment of the invention, the anti-noise process includes adjusting an output frequency of the authorization audio message according to the environmental sound frequency.

According to an embodiment of the invention, the information to be shared by the first device is at least part of contents displayed on a screen of the first device.

According to an embodiment of the invention, at least one of the first surface and the second surface has a screen.

According to an embodiment of the invention, the first sensor and the second sensor are proximity sensors, photo-sensors, near field communication (NFC) sensors, or radio frequency identification (RFID) sensors.

According to an embodiment of the invention, the wireless transmission protocol is a Bluetooth transmission protocol, a wireless fidelity (WiFi) transmission protocol, an NFC transmission protocol, or an infrared transmission protocol.

In light of the foregoing, when the first device is about to share information, the first device not only determines whether or not another device approaches the first device but also identifies the approaching device according to the audio-based authorization mechanism. Thereby, erroneous determination of the device for sharing information may be prevented, and the information may be shared in an effective manner.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EXEMPLARY EMBODIMENTS

Figure 1:
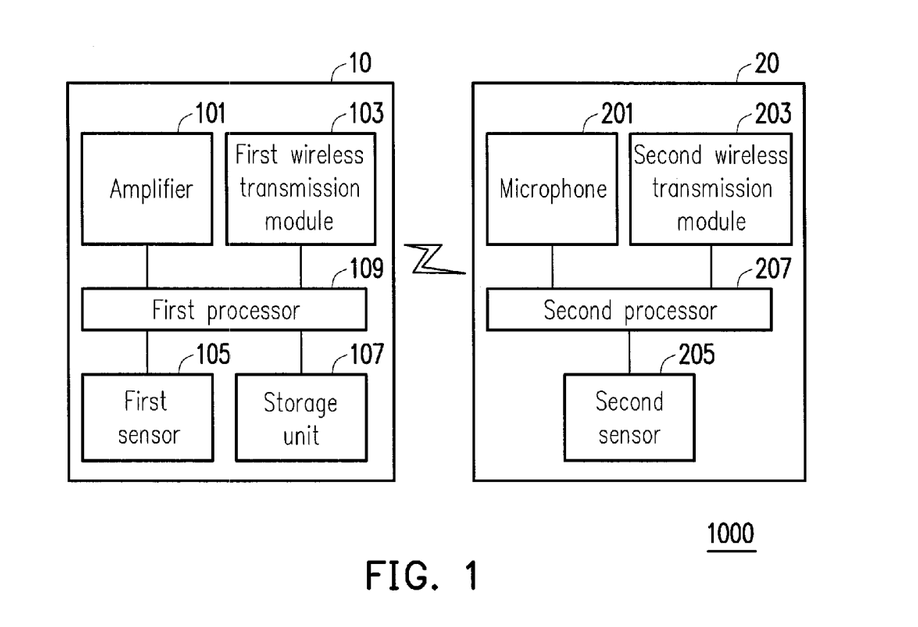
FIG. 1 is a schematic diagram illustrating an information sharing system according to an embodiment of the invention.

FIG. 1 is a schematic diagram illustrating an information sharing system according to an embodiment of the invention. With reference to FIG. 1, the information sharing system 1000 includes a first device 10 and a second device 20 that may communicate with each other through a wireless transmission protocol. In the present embodiment, the first device 10 and the second device 20 may be cell phones, smart phones, personal digital assistants (PDA), PDA phones, notebook computers, tablet PCs, digital cameras, e-books, or game consoles, which should however not be construed as a limitation to the invention.

The first device 10 includes an amplifier 101, a first wireless transmission module 103, a first sensor 105, a storage unit 107, and a first processor 109; the functions of these components are respectively described below.

The amplifier 101 serves to output audio data. For instance, when the first device 10 plays a multimedia file, a user may listen to the audio data through the amplifier 101. If the first device 10 allows voice chat, the user may hear the voice of another user through the amplifier 101.

The first wireless transmission module 103 may be a Bluetooth transmission module, a wireless fidelity (WiFi) transmission module, a near field communication (NFC) transmission module, or an infrared transmission module, and the first wireless transmission module 103 may be connected to and may share information with another device through wireless transmission.

The first sensor 105 is configured on a first surface (not shown) of the first device 10 and may be a proximity sensor (e.g., an infrared proximity sensor, an ultrasonic proximity sensor, and so on), a photo-sensor, an NFC sensor, or a radio frequency identification (RFID) sensor for detecting if there is any nearby object. In the present embodiment, a screen (not shown) of the first device 10 is configured on the first surface, and therefore the first sensor 105 is able to detect if any object approaches the screen of the first device 10. Note that the location of the first sensor 105 is not limited in the invention;

in other embodiments, the first sensor 105 may be located anywhere on the body of the first device 10.

The storage unit 107 may be a read-only memory (ROM), a flash memory, a magnetic disk storage device, an external memory card, or network storage space.

The first processor 109 is coupled to the amplifier 101, the first wireless transmission module 103, the first sensor 105, and the storage unit 107. The first processor 109 is, for instance, a central processing unit (CPU), any other programmable microprocessor or digital signal processor (DSP) for general or special purposes, a programmable controller, an application specific integrated circuit (ASIC), any other similar component, or a hardware device containing a combination of the aforesaid components. Alternatively, the first processor 109 may be a software component characterized by the logical computation capability and the processing ability, e.g., an operating system, an application program, and so forth. The first processor 109 may also be a combination of said hardware device and said software component. The first processor 109 serves to control the overall operation of the first device 10; in particular, the first processor 109 is applied for determining whether to initiate an information sharing procedure.

In another embodiment of the invention, the first device 10 further includes a microphone (not drawn). The microphone is coupled to the first processor 109 for receiving external audio data.

The second device 20 includes a microphone 201, a second wireless transmission module 203, a second sensor 205, and a second processor 207; the functions of these components are respectively described below.

The microphone 201 serves to receive external audio data. Besides, the microphone 201 may be built in the second device 20 or externally connected to the second device 20 through a connection cable.

The second wireless transmission module 203 may be a Bluetooth transmission module, a WiFi transmission module, an NFC transmission module, or an infrared transmission module, and the second wireless transmission module 203 may be connected to and may share information with another device through wireless transmission. In the present embodiment, the second wireless transmission module 203 and the first wireless transmission module 103 support the same wireless transmission protocol.

The second sensor 205 is configured on a second surface (not shown) of the second device 20 for detecting if there is any nearby object. For instance, the second sensor 205 may be a proximity sensor, a photo-sensor, an NFC sensor, or an RFID sensor. When a screen (not shown) of the second device 20 is placed on the second surface, the second sensor 205 may detect if any object approaches the screen. Note that the second sensor 205 is not limited to be configured on the second surface; in other embodiments, the second sensor 205 may be located anywhere on the body of the second device 20.

The second processor 207 is coupled to the microphone 201, the second wireless transmission module 203, and the second sensor 205. Besides, the second processor 207 may be a CPU, any other programmable microprocessor or DSP for general or special purposes, a programmable controller, an ASIC, any other similar component, or a hardware device containing a combination of the aforesaid components. Alternatively, the second processor 207 may be a software component characterized by the logical computation capability and the processing ability, e.g., an operating system, an application program, and so forth. The second processor 207 may also be a combination of said hardware device and said software component. Here, the second processor 207 serves to control the overall operation of the second device 20.

In another embodiment of the invention, the second device 20 further includes an amplifier (not drawn). The amplifier is coupled to the second processor 207 for outputting audio data.

Figure 2:
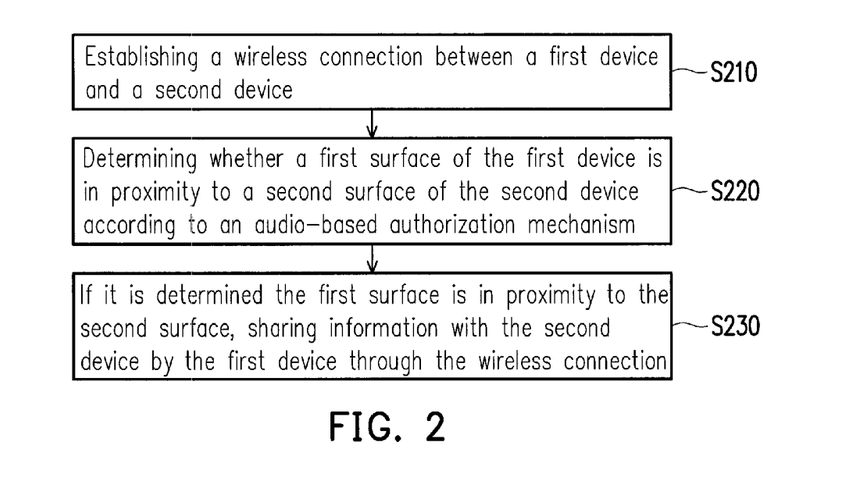
FIG. 2 is a flowchart illustrating an information sharing method according to an embodiment of the invention.

To further elaborate the operational manner of the information sharing system 1000, the detailed steps of the information sharing method is provided hereinafter with reference to FIG. 2. Please refer to both FIG. 1 and FIG. 2.

In step S210, a wireless connection between a first device 10 and a second device 20 is established. Since a first wireless transmission module 103 of the first device 10 and a second wireless transmission module 203 of the second device 20 support the same wireless transmission protocol (e.g., a Bluetooth transmission protocol, a WiFi transmission protocol, an NFC transmission protocol, or an infrared transmission protocol), the two transmission modules 103 and 203 may establish the wireless connection between the first and second devices 10 and 20 according to the wireless transmission protocol. In the present embodiment, the first device 10 may initially set up the wireless connection, whereas the invention is not limited thereto.

In step S220, a first processor 109 determines whether a first surface of the first device 10 is in proximity to a second surface of the second device 20 according to an audio-based authorization mechanism. Particularly, even though a first sensor 105 and a second sensor 205 are both applied to detect if there is any nearby object, the detection results of the first and second sensors 105 and 205 are not the only criterion of determining whether the first surface of the first device 10 is in proximity to the second surface of the second device 20 according to the present embodiment. Namely, the audio-based authorization mechanism is further employed for said determination. The audio-based authorization mechanism is activated with a relatively small sound volume. Hence, the audio-based authorization mechanism may be successfully activated by both the first and second devices 10 and 20 only when the second device 20 is rather close to the first device 10. Thereby, it is likely to exclude the condition that the first and second devices 10 and 20 are apart at a great distance from each other but are respectively covered by another object, and thus accuracy of the determination may be guaranteed.

In step S230, if it is determined the first surface is in proximity to the second surface, the first processor 109 instructs the first device 10 to initiate the information sharing procedure, i.e., information is shared with the second device 20 through the wireless connection. In the present embodiment, the information shared with the second device 20 is the contents or part of the contents displayed on the screen of the first device 10 when the first surface is in proximity to the second surface, for instance. If a photo is displayed on the screen of the first device 10, for instance, the first processor 109 may in this step share the photo with the second device 20 through the first wireless transmission module 103. Alternatively, if a webpage is shown on the screen of the first device 10, the first processor 109 may share the web address of the webpage and/or the contents of the webpage with the second device 20 through the first wireless transmission module 103. In other embodiments of the invention, the first processor 109 may also share a file pre-selected by a user (e.g., a file stored in the storage unit 107), texts that are being edited, a file/an application program in use, or relevant information with the second device 20.

Figure 3:
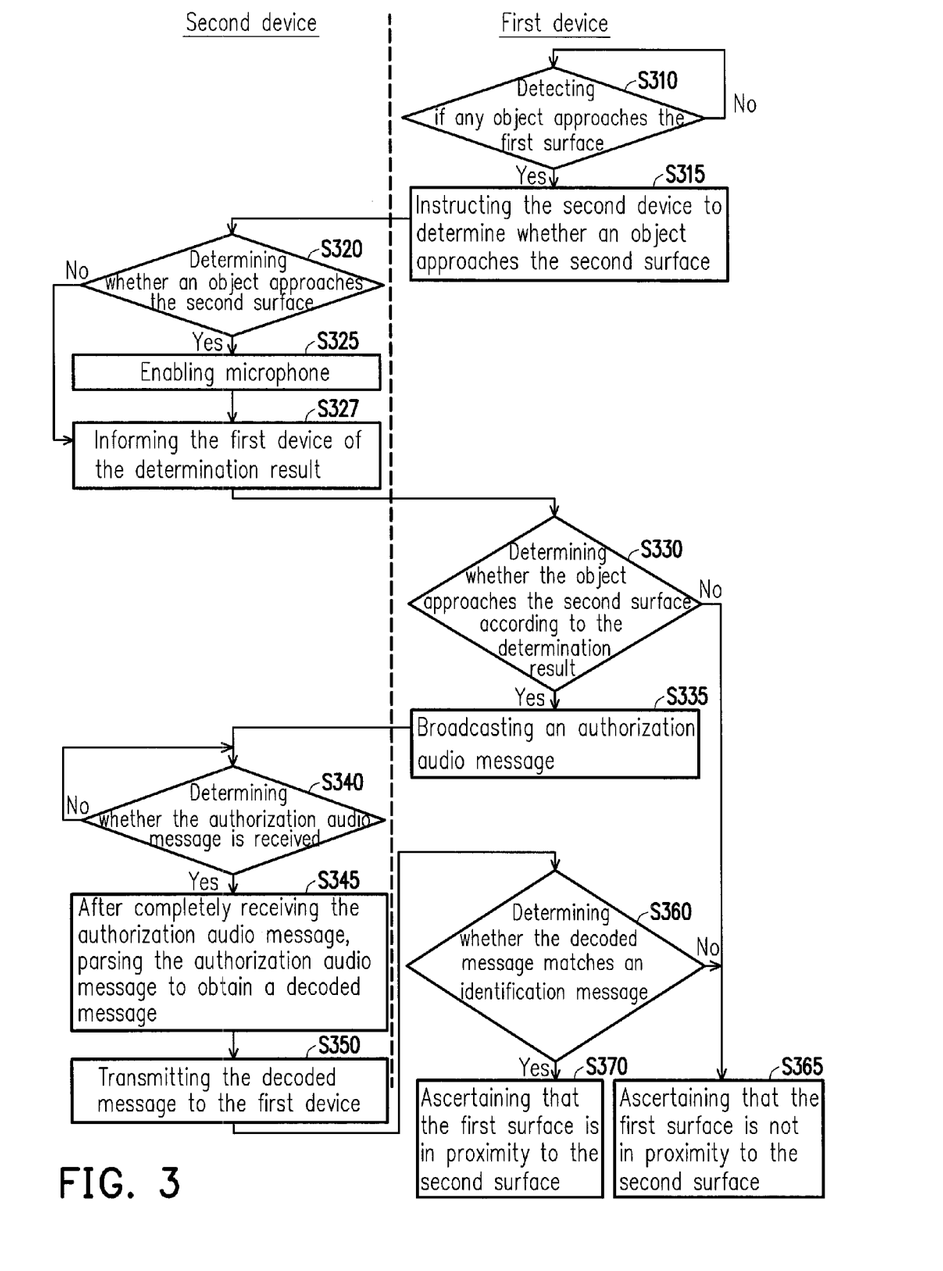
FIG. 3 is a flowchart of determining whether a first surface is in proximity to a second surface according to an embodiment of the invention.

The way to determine whether the first surface of the first device 10 is in proximity to the second surface of the second device 20 according to the audio-based authorization mechanism is described hereinafter with reference to FIG. 3.

The first sensor 105 described in the present embodiment is configured on the first surface of the first device 10. Therefore, after the first device 10 is activated, the first sensor 105 in step S310 is able to continuously detect if any object approaches the first surface.

If an object is detected to approach the first surface, in step S315, the first processor 109 instructs the second device 20 through the wireless connection to determine whether an object approaches the second surface 20. To be specific, the first processor 109 may, according to the wireless transmission protocol regulating the wireless connection, send a message and require the second device 20 to determine if there is any object that approaches the second surface.

The second sensor 205 described in the present embodiment is configured on the second surface of the second device 20. Therefore, in step S320, the second processor 207 is able to determine if there is any object that approaches the second surface according to the detection result of the second sensor 205.

If the second sensor 205 detects that the object approaches the second surface, the second processor 207 in step S325 enables the microphone 201 to receive the authorization audio message from the first device 10. In step S327, the second processor 207 transmits the determination result back to the first device 10 through the wireless connection.

If the second sensor 205 detects no object that approaches the second surface, the second processor 207 in step S327 sends the determination result back to the first device 10.

In step S330, the first processor 109, after receiving the determination result from the second device 20, determines whether an object approaches the second surface of the second device 20 according to the determination result. If it is determined that no object approaches the second surface, the first processor 109 in step S365 determines that the first surface is not in proximity to the second surface.

If, according to the determination result obtained from the second device 20, any object is determined to approach the second surface, the first processor 109 will make further determination. In step S335, the first processor 109 delivers (broadcasts) the authorization audio message stored in the storage unit 107. Here, a specific identification message is embedded in the authorization audio message. According to another embodiment of the invention, the first processor 109 performs an anti-noise process on the authorization audio message according to an environmental sound volume and/or an environmental sound frequency and then delivers (broadcasts) the processed authorization audio message. For instance, the anti-noise process may include adjusting a high-frequency sound volume and/or a low-frequency sound volume of the authorization audio message according to the environmental sound volume, or adjusting an output frequency of the authorization audio message according to the environmental sound frequency. However, the invention is not limited thereto.

When the first processor 109 starts to broadcast the authorization audio message, the second device 20 should be able to receive the authorization audio message if the second device 20 is rather close to the first device 10. Hence, in step S340, the second processor 207 repetitively determines whether the second device 20 receives the authorization audio message.

If it is determined that the second device 20 receives the authorization audio message, in step S345, the second processor 207 performs a parsing procedure to obtain a decoded message from the authorization audio message after completely receiving the authorization audio message. In step S350, the second processor 207 controls the second wireless transmission module 203 to transmit the decoded message back to the first device 10 through the wireless connection or the amplifier of the second device 20. Note that if the second processor 207 transmits the decoded message through the amplifier of the second device 20, the first device 10 receives the decoded message from the second device 20 through the microphone of the first device 10.

After receiving the decoded message, the first processor 109 in step S360 determines whether the decoded message matches the identification message. If it is determined that no object approaches the second surface, the first processor 109 in step S365 determines that the first surface is not in proximity to the second surface. However, if it is ascertained that the decoded message matches the identification message, the first processor 109 in step S370 determines that the first surface is in proximity to the second surface.

If the second device 20 does not receive the authorization audio message within a certain time frame (e.g., within one second after the second device informs the first device 10 of the determination result) in step S340, the second device 20 may be apart at a relatively large distance from the first device 10. Accordingly, the second device 20 is unable to parse the message from the authorization audio message, and thus the first device 10 is unlikely to receive the decoded message from the second device 20. In the present embodiment, after the first device 10 sends the authorization audio message, the first processor 109 also determines that the first surface is not in proximity to the second surface if the first device 10 does not receive the reply from the second device 20 within a certain period of time.

Despite the fact that the first sensor 105 and the second sensor 205 may individually serve to detect if any object approaches the first and second devices 10 and 20, it should be mentioned that the first and second devices 10 and 20 may actually be apart at a distance from each other but may respectively be covered by other objects under certain circumstances. To prevent said situation from being mistakenly determined to be a permission to start the data-sharing operation between the devices, the steps shown in FIG. 3 are performed in the present embodiment to further determine whether the first device 10 is in proximity to the second device 20.

Figure 4A:
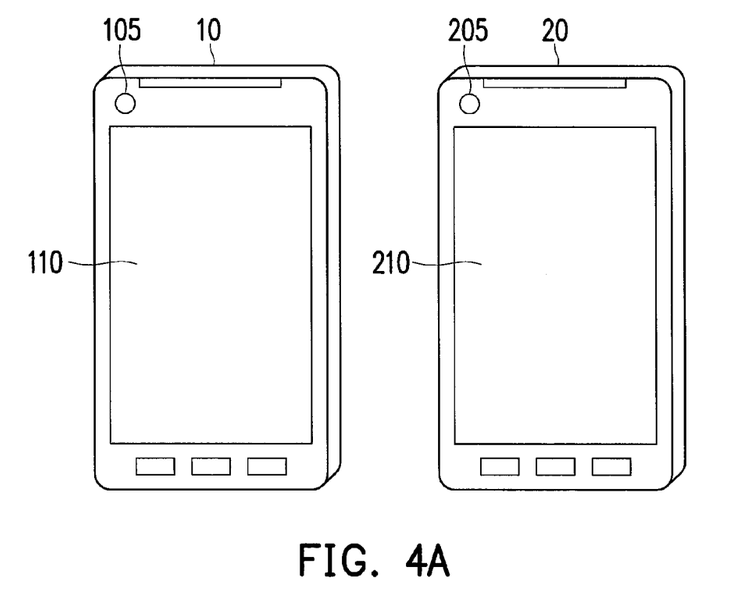
FIG. 4A and FIG. 4B are schematic diagrams illustrating an appearance of a first device and an appearance of a second device according to an embodiment of the invention.
Figure 4B:
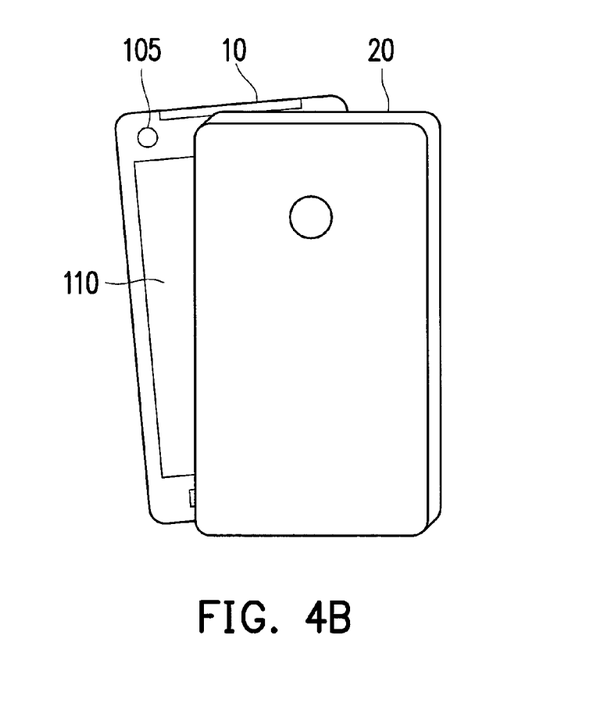

FIG. 4A and FIG. 4B are schematic diagrams illustrating an appearance of a first device and an appearance of a second device according to an embodiment of the invention. As illustrated in FIG. 4A, the first device 10 and the second device 20 respectively have a screen 110 and a screen 210. The screen 110 and the first sensor 105 are placed on the same surface of the first device 10, and the screen 210 and the second sensor 205 are placed on the same surface of the second device 20.

If a user intends to share browse information (i.e., the contents shown on the screen 110 of the first device 10) with the second device 20, the first device 10 and/or the second device 20 may be turned around, such that the screen 110 is in proximity to the screen 210. After the steps shown in FIG. 2 and FIG. 3 are performed, the information displayed on the screen 110 of the first device 10 may then be shared with the second device 20.

From the viewpoint of the user, the data-sharing operation may be done merely by drawing the first and second devices 10 and 20 near to each other and bringing them face to face, and the information may then be shared as if the information is transfer-printed from the screen 110 to the screen 210.

According to the previous embodiments, each of the first surface of the first device 10 and the second surface of the second device 20 has the screen thereon; however, note that the screen and the sensor are not restricted to be disposed on the same surface in the invention. In another embodiment of the invention, it is likely to configure a screen on the first surface of the first device 10 but not on the second surface of the second device 20. Hence, the screen and the first sensor 105 of the first device 10 are placed on the same surface, while the screen and the second sensor 205 of the second device 20 are placed on difference surfaces of the second device 20.

Figure 5:
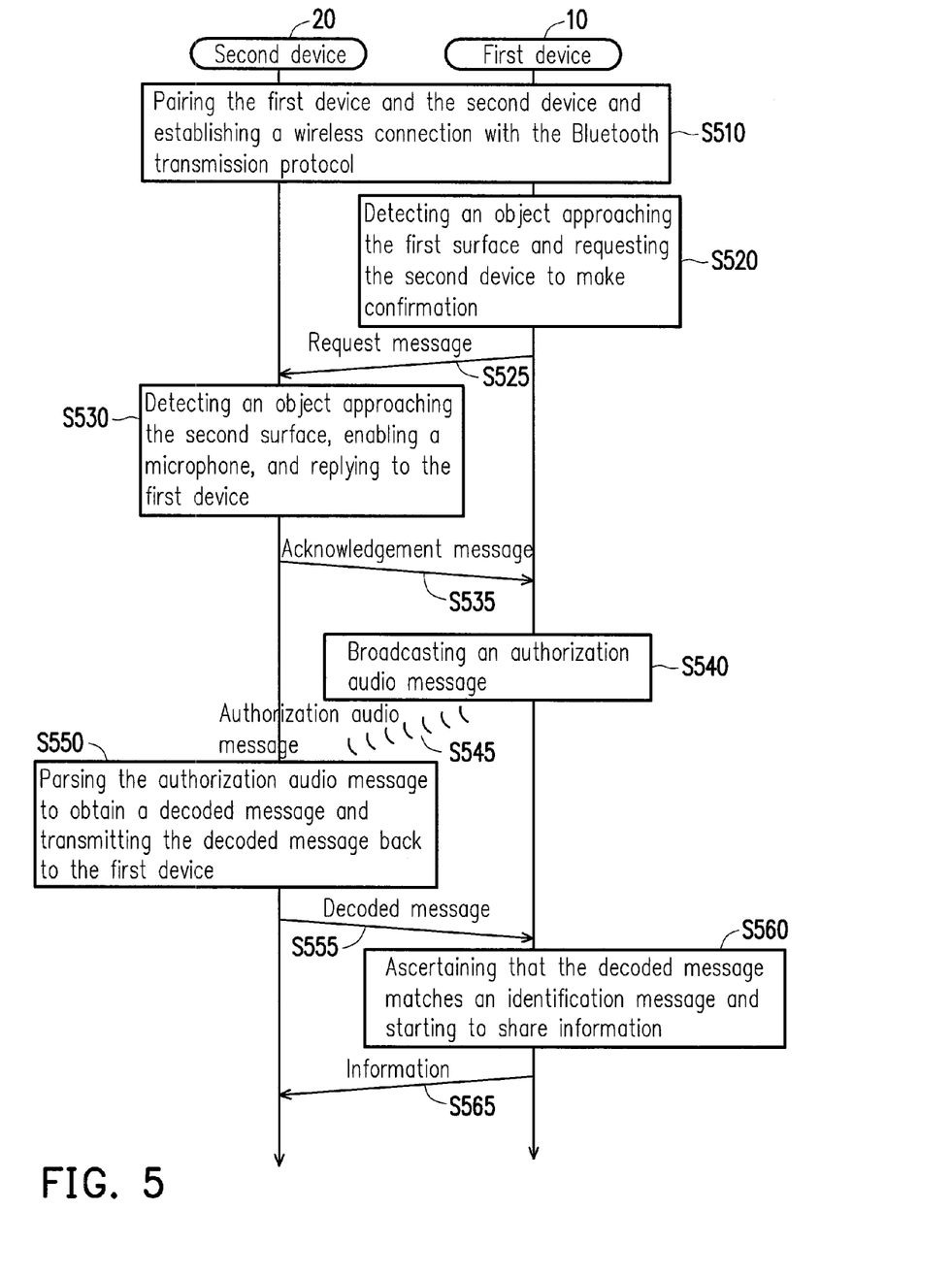
FIG. 5 is a flowchart illustrating an information sharing method according to another embodiment of the invention.

FIG. 5 is a flowchart illustrating an information sharing method according to another embodiment of the invention. With reference to FIG. 1 and FIG. 5, in the present embodiment, the first wireless transmission module 103 and the second wireless transmission module 203 are assumed to be Bluetooth transmission modules.

In step S510, the first wireless transmission module 103 and the second wireless transmission module 203 are paired with each other in accordance with the Bluetooth transmission protocol, so as to establish a wireless connection between the first device 10 and the second device 20.

In step S520, when the first sensor 105 of the first device 10 detects an object that approaches the first surface of the first device 10, the first processor 109 sends a request message in accordance with the Bluetooth transmission protocol, so as to request the second device 20 for confirmation. In step S525, the request message may be transmitted to the second device 20 through the wireless connection.

Figure 6:
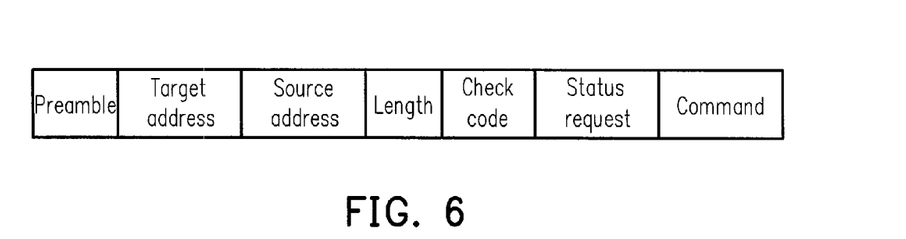
FIG. 6 is a schematic diagram illustrating a format of a request message according to an embodiment of the embodiment.

The request message may, for instance, be in the format shown in FIG. 6 and includes a preamble column, a target address column, a source address column, a length column, a check code column, a status request column, and a command column. Here, the preamble column serves to record a specific identification code (e.g., 10101010), such that a receiving end may identify the message. The target address column serves to record an address of the second device 20, e.g., a Bluetooth multimedia access control (MAC) address of the second device 20. The source address column serves to record an address of the first device 10, e.g., an MAC address of the first device 10. The length column serves to record the length of the request message. The check code column serves to record an error detection code, e.g., a cyclic redundancy check (CRC) code. The first device 10 may require the second device 20 to make a confirmation on certain data, e.g., the detection result of the second sensor 205, the status of the microphone 201, and so on, and the status request column serves to record these data. The command column serves to record a special command for enabling the microphone 201.

In step S530, if the request message is received from the first device 10, and the second sensor 205 of the second device 20 detects an object that approaches the second surface of the second device 20, the second processor 207 enables the microphone 201 by means of the special command in the request message and replies to the first device 10. In step S535, the acknowledgement message is transmitted from the second device 20 to the first device 10 through the wireless connection. After the second device 20 delivers the acknowledgement message, the second device 20 prepares for listening to the authorization audio message.

Figure 7:
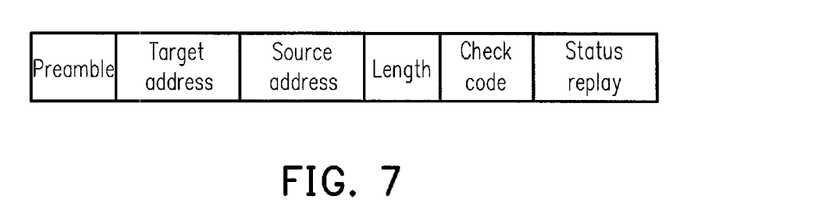
FIG. 7 is a schematic diagram illustrating a format of an acknowledgement message according to an embodiment of the embodiment.

According to the present embodiment, the acknowledgement message may, for instance, be in the format shown in FIG. 7 and includes a preamble column, a target address column, a source address column, a length column, a check code column, and a status reply column. Particularly, the preamble column serves to record a specific identification code (e.g., 10101010), such that a receiving end may identify the message. The target address column serves to record an address of the first device 10, e.g., an MAC address of the first device 10. The source address column serves to record an address of the second device 20, e.g., an MAC address of the second device 20. The length column serves to record the length of the acknowledgement message. The check code column serves to record an error detection code, e.g., a CRC code. The first bit of the status reply column serves to record the detection result of the second sensor 205, and the second bit serves to record the status of the microphone 201. For instance, when the first bit is 0, it indicates that the second sensor 205 does not detect any nearby object; when the first bit is 1, it indicates that the second sensor 205 detects a nearby object. When the second bit is 0, it indicates that the microphone 201 is not enabled; when the second bit is 1, it indicates that the microphone 201 is enabled.

Figure 8:
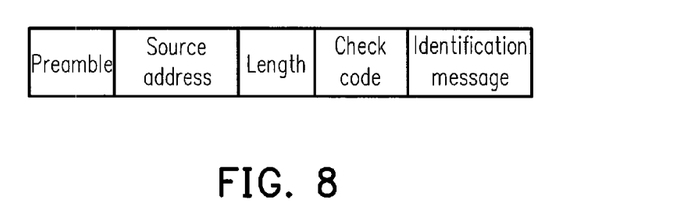
FIG. 8 is a schematic diagram illustrating a format of an authorization audio message according to an embodiment of the embodiment.

The first processor 109 in step S540 controls the amplifier 101 to broadcast the authorization audio message, and the authorization audio message may be transmitted from the amplifier 101 to the second device 20 in step S545. According to the present embodiment, the authorization audio message is, for instance, a dual-tone multi-frequency (DTMF) signal, while the signal type of the authorization audio message is not limited in the invention. FIG. 8 is a schematic diagram illustrating a format of an authorization audio message according to an embodiment of the embodiment. With reference to FIG. 8, the authorization audio message includes a preamble column, a source address column, a length column, a check code column, and an identification message column. Here, the preamble column serves to record a specific identification code (e.g., 10101010), such that a receiving end may identify the audio message. The source address column serves to record an address of the first device 10, e.g., an MAC address of the first device 10. The length column serves to record the length of the authorization audio message. The check code column serves to record an error detection code, e.g., a CRC code. The identification message column records an identification message. For instance, the identification message may be a bunch of specific numbers (e.g., 0x1234).

Figure 9:
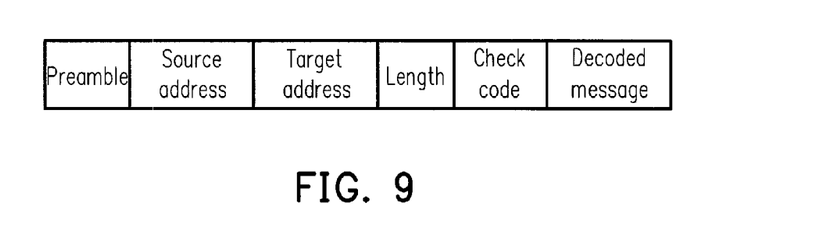
FIG. 9 is a schematic diagram illustrating a format of a decoded message according to an embodiment of the embodiment.

In step S550, the second processor 207 performs a parsing procedure to obtain a decoded message from the authorization audio and transmits the decoded message to the first device 10. In step S555, the decoded message is transmitted to the first device 10 through the wireless connection (or the amplifier of the second device 20). According to the present embodiment, the decoded message may, for instance, be in the format shown in FIG. 9 and includes a preamble column, a target address column, a source address column, a length column, a check code column, and a decoded message column. Here, the preamble column serves to record a specific identification code (e.g., 10101010), such that a receiving end may identify the audio message. The source address column serves to record an address of the second device 20, e.g., an MAC address of the second device 20. The target address column serves to record an address of the first device 10, e.g., an MAC address of the first device 10. The length column serves to record the length of the decoded message. The check code column serves to record an error detection code. The decoded message column serves to record the decoded message parsed by the second processor 207.

After the first device 10 receives the decoded message, the first device 10 may thereby determine whether a data-sharing process is to be initiated. Specifically, in step S560, the first processor 109 starts to share information after ascertaining that the decoded message matches the identification message. In step S565, the first processor 109 shares the information with the second device 20 through the wireless connection.

Although the data-sharing operation is performed between two devices in the previous embodiments, it should be mentioned that the invention is not limited thereto. For instance, it is assumed that there are three or more devices D1~Dn among which the wireless connection is already established. Here, n is a positive integer greater than 2. When a user intends to share information from the device D1 to one of the devices D2~Dn (e.g., the device D2), the user does not need to manually configure the device D2 as a target device through a specific interface or menu of the device D1. As long as the user draws the device D2 near to the device D1 (e.g., draws the surface of the device D2 where the sensor of the device D2 is located near to the surface of the device D1 where the sensor of the device D1 is located and brings the two surfaces face to face), the devices D1 and D2 may spontaneously start to share information therebetween according to the audio-based authorization mechanism, which significantly reduces time and efforts. At this time, even though any device (e.g., the device D3) other than the device D2 is covered by an object, the device D3 is unlikely to successfully activate and complete the audio-based audio authorization because the distance between the device D1 and the device D3 is relatively far and the device D3 is thus unable to receive the authorization audio message from the device D1. Thereby, it is certain that the device D1 does not share information with any device other than the device D2.

To sum up, according to the information sharing method and the information sharing system described herein, the target device for sharing information is double confirmed by detecting if there is a nearby object and by activating an audio-based authorization mechanism. Thereby, erroneous determination of the device for sharing information may be prevented, and the information is shared in full accordance with the user's intention. In terms of operation, manual settings of data-sharing targets by a user is no longer required, and the information sharing method and the information sharing system described herein allow a user to rapidly and intuitively share information between two devices.

It will be apparent to those skilled in the art that various modifications and variations can be made to the structure of the disclosed embodiments without departing from the scope or spirit of the invention. In view of the foregoing, it is intended that the invention covers modifications and variations of this invention provided they fall within the scope of the following claims and their equivalents.

What is claimed is:

1. An information sharing method comprising:
   establishing a wireless connection between a first device and a second device;
   determining, by a first proximity sensor of the first device and a second proximity sensor of the second device, whether a first object and a second object are approached to the first device and the second device respectively;
   determining whether a first surface of the first device is in proximity to a second surface of the second device according to an audio-based authorization mechanism if it is determined that the first object and the second object are approached to the first device and the second device respectively, wherein the audio-based authorization mechanism is activated through an authorization audio message outputted by an amplifier of the first device and received by a microphone of the second device, wherein an identification message is embedded in the authorization audio message; an anti-noise process performed on the authorization audio message by the first device according to at least one of environmental sound volume and environmental sound frequency and a broadcast of the processed authorization audio message and adjusting a high-frequency sound volume and/or a low-frequency sound volume of the authorization audio message according to the environmental sound volume and
   sharing information by the first device with the second device through the wireless connection if it is determined the first surface is in proximity to the second surface, wherein the shared information corresponds to at least part of contents displayed on a screen of the first device.

2. The information sharing method as recited in claim 1, wherein the first device stores the authorization audio message, and the step of determining whether the first surface of the first device is in proximity to the second surface of the second device according to the audio-based authorization mechanism comprises:
   if the first device detects the first object approaches the first surface, instructing the second device through the wireless connection to determine whether the second object approaches the second surface;
   if the second device detects the second object approaches the second surface, preparing to receive the authorization audio message from the first device by the second device;
   after the second device completely receives the authorization audio message, performing a parsing procedure to obtain a decoded message from the authorization audio message and transmitting the decoded message to the first device; and
   after the first device ascertains the decoded message matches the identification message, determining the first surface is in proximity to the second surface.

3. The information sharing method as recited in claim 1, wherein the anti-noise process comprises:
   adjusting an output frequency of the authorization audio message according to the environmental sound frequency.

4. An information sharing system comprising:
   a first device comprising:
      a first amplifier;
      a first wireless transmission module;
      a first proximity sensor
      a screen; and
      a first processor coupled to the first amplifier, the first wireless transmission module, and the first proximity sensor; and
   a second device comprising:
      a second microphone;
      a second wireless transmission module, a wireless connection between the first device and the second device being established by the first wireless transmission module and the second wireless transmission module according to a wireless transmission protocol;
      a second proximity sensor; and
      a second processor coupled to the second microphone, the second wireless transmission module, and the second proximity sensor,
   wherein the first proximity sensor of the first device and the second proximity sensor of the second device determine whether a first object and a second object are approached to the first device and the second device respectively,
   wherein the first processor determines whether a first surface of the first device is in proximity to a second surface of the second device according to an audio-based authorization mechanism if the first proximity sensor and the second proximity sensor determine that the first object and the second object are approached to the first device and the second device respectively, wherein the audio-based authorization mechanism is activated through an authorization audio message outputted by the first amplifier and received by the second microphone, wherein an identification message is embedded in the authorization audio message, wherein the anti-noise process comprises adjusting a high-frequency sound volume and/or a low-frequency sound volume of the authorization audio message according to the environmental sound volume, and wherein the anti-noise process comprises adjusting an output frequency of the authorization audio message according to the environmental sound frequency and if it is determined the first surface is in proximity to the second surface, the first processor shares information with the second device through the wireless connection, wherein the shared information corresponds to at least part of contents displayed on the screen of the first device.

5. The information sharing system as recited in claim 4, wherein the first device further comprises:

a storage unit coupled to the first processor, the storage unit storing the authorization audio message, wherein if the first device detects the first object approaches the first surface, the first processor instructs the second device through the wireless connection to determine whether the second object approaches the second surface, if the second sensor detects the second object approaches the second surface, the second processor activates the second microphone and prepares to receive the authorization audio message from the first device, after the second processor completely receives the authorization audio message, the second processor performs a parsing procedure to obtain a decoded message from the authorization audio message and transmits the decoded message to the first device, and after the first processor ascertains the decoded message matches the identification message, the first processor determines the first surface is in proximity to the second surface.

6. The information sharing system as recited in claim 5, wherein the second processor transmits the decoded message to the first device through the wireless connection.

7. The information sharing system as recited in claim 5, wherein the first device further comprises a first microphone coupled to the first processor, the second device further comprises a second amplifier coupled to the second processor, the second processor transmits the decoded message through the second amplifier, and the first device receives the decoded message through the first microphone.

8. The information sharing system as recited in claim 4, wherein the first processor performs an anti-noise process on the authorization audio message according to at least one of environmental sound volume and environmental sound frequency and broadcasts the processed authorization audio message.

9. The information sharing system as recited in claim 4, wherein the wireless transmission protocol is a Bluetooth transmission protocol, a wireless fidelity transmission protocol, a near field communication transmission protocol, or an infrared transmission protocol.

* * * * *